(12) United States Patent
Thomassin et al.

(10) Patent No.: US 7,070,496 B2
(45) Date of Patent: Jul. 4, 2006

(54) AIR OUTLET DEVICE FOR A VEHICLE, ESPECIALLY FOR AN AIRPLANE

(75) Inventors: Stefan Thomassin, Lippstadt (DE); Frank Poehlau, Nuremberg (DE); Klaus Kurz, Ansbach (DE)

(73) Assignee: Goodrich Hella Aerospace Lighting Systems GmbH, Lippstadt (DE)

( * ) Notice: Subject to any disclaimer, the term of this patent is extended or adjusted under 35 U.S.C. 154(b) by 0 days.

(21) Appl. No.: 11/016,716

(22) Filed: Dec. 21, 2004

(65) Prior Publication Data

US 2005/0197056 A1    Sep. 8, 2005

Related U.S. Application Data

(62) Division of application No. 10/600,538, filed on Jun. 23, 2003, now Pat. No. 6,887,147, which is a division of application No. 10/042,152, filed on Jan. 11, 2002, now Pat. No. 6,589,109.

(51) Int. Cl.
*B64D 13/02* (2006.01)

(52) U.S. Cl. .......................................... 454/71; 454/76

(58) Field of Classification Search .................. 454/71, 454/76, 154, 286, 323, 334
See application file for complete search history.

(56) References Cited

U.S. PATENT DOCUMENTS

| | | | |
|---|---|---|---|
| 2,232,573 A | * | 2/1941 | Teves .......................... 454/286 |
| 2,596,909 A | * | 5/1952 | Ross et al. ..................... 454/73 |
| 3,799,046 A | | 3/1974 | Gorchev |
| 5,399,119 A | | 3/1995 | Birk et al. |
| 5,575,715 A | * | 11/1996 | Norbury et al. ............. 454/286 |
| 5,733,189 A | * | 3/1998 | Eastwood .................... 454/155 |
| 6,402,610 B1 | | 6/2002 | Gloisten |
| 6,610,116 B1 | | 8/2003 | Avery |
| 6,645,065 B1 | | 11/2003 | Rooney et al. |

FOREIGN PATENT DOCUMENTS

DE    1218 892    6/1966

* cited by examiner

*Primary Examiner*—Derek S. Boles
(74) *Attorney, Agent, or Firm*—Birch, Stewart, Kolasch & Birch, LLP

(57) ABSTRACT

An air outlet device for a vehicle, especially for an aircraft, comprises a nozzle body with an air intake opening and an air outlet opening. The air outlet device further comprises a holding element formed with an accommodating opening having the nozzle body supported therein for rotation about a longitudinal axis extending through the air intake opening and the air outlet opening, and a valve body arranged coaxially within the nozzle body and guided by the holding element. Upon rotation of the nozzle body, the valve body can be displaced in the nozzle body between a closing position for blocking the air outlet opening and a maximum opening position for clearing the air outlet opening to the maximum extent. The valve body is of a hollow configuration.

15 Claims, 4 Drawing Sheets

AIR OUTLET DEVICE FOR A VEHICLE, ESPECIALLY FOR AN AIRPLANE

This non-provisional application is a divisional of application Ser. No. 10/600,538 filed on Jun. 23, 2003, U.S. Pat. No. 6,887,147 which is a divisional of application Ser. No. 10/042,152, now U.S. Pat. No. 6,589,109 B2 filed on Jan. 11, 2002 and issued on Jul. 8, 2003, the entire contents of which are hereby incorporated by reference, and claims priority under 35 U.S.C. §119(a) on Patent Application No. 101 01 232.2, filed in Germany on Jan. 11, 2001, which is also herein incorporated by reference.

BACKGROUND OF THE INVENTION

The present invention relates to an air outlet device for a vehicle.

As a common feature in vehicles, particularly in airplanes and busses, it is provided that each passenger can set a cooling air stream individually for his or her convenience by means of an air discharge nozzle arranged in the ceiling above the seat. Such air outlet devices ("air showers") comprise a nozzle body to be selectively closed and set to different spatial configurations so that the discharged air stream can be oriented correspondingly.

An air outlet device of the above type is known e.g. from U.S. Pat. No. 5,399,119. This air outlet device comprises a nozzle body with an air intake opening and an air outlet opening. Arranged within the nozzle body is a coaxial valve body which, by turning the nozzle body, can be displaced between a closed position for closing the air outlet opening and one of several opening positions arranged to open the air outlet opening to a higher or lesser extent. The nozzle body is supported for rotation on a holding element, which in turn is supported in a holding recess formed in a ceiling panel above the seat.

Particularly in aircraft construction, the desired reduction of weight dictates a light-weighted and nonetheless stable construction of the individual components. The above mentioned known air outlet device is of a rather material-intensive and thus heavy design. Further, the known air outlet device comprises a very small operating member for the nozzle body because the operating member for the nozzle body is inserted from inside into the holding member and will then project therefrom through an accommodating opening. Thus, the diameter of the operating member can be at best as large as the diameter of the accommodating opening while a still larger diameter is not possible. Further, in air outlet devices of the type discussed herein and thus also in the above known air outlet device, the valve body is visible from the outside, with inherent design restrictions because the valve body should be adapted in color to the surrounding area of the passenger cabin. Further, it is to be considered that the discharged air stream may cause flow noises when passing the nozzle body. Thus, for added passenger comfort, it is desirable to suppress such noises as far as possible.

Therefore, in air outlet devices of the above type, a necessity exists for improvements in various regards, as outlined above.

SUMMARY OF THE INVENTION

According to a first aspect of the instant invention, there is proposed an air outlet device for a vehicle, especially for an airplane, comprising a nozzle body with an air intake opening and an air outlet opening, a holding element formed with an accommodating opening having the nozzle body supported therein for rotation about a longitudinal axis extending through the air intake opening and the air outlet opening, and a valve body arranged coaxially within the nozzle body and guided by the holding element, wherein, upon rotation of the nozzle body, the valve body can be displaced in the nozzle body between a closing position for blocking the air outlet opening and a maximum opening position for clearing the air outlet opening to the maximum extent, the valve body being of a hollow configuration.

To reduce the constructional weight, the air outlet device according to the present invention comprises a valve body, which is of a hollow configuration. The valve body is preferably formed in two parts, notably in such a manner that the valve body is closed on its end facing towards the air intake opening of the nozzle body and is open at the closing end facing towards the air outlet opening. Thus, a valve body of this type is of a dome-shaped hollow design which can be produced in a simple manner, e.g. by injection molding. The open closing end can be closed by a cover member forming the second part of the two-part configuration of the valve body. This cover member, which can be provided after the manner of a (closure) plug, can be of a different color from the valve body. This makes it possible to adapt the design of the valve body to the interior design of the passenger cabin of the vehicle (airplane).

The feature that the valve body has its closing end provided with a cover member can be realized also in valve bodies which are solid, i.e. not hollow. Thus, within the scope of the present invention, the adapting of the valve body design is a feature in its own right.

According to a preferred embodiment of the invention, the valve body is in guiding engagement with the holding element via a coupling member. This guiding engagement can be e.g. a threaded engagement wherein, in this case, the coupling member is provided with an outer thread cooperating with an inner thread of the holding element. For this purpose, the coupling member comprises a continuous ring having its outer side provided with the thread. For reasons of weight reduction, the inner thread of the holding element is preferably segmented, i.e. it does not extend along 360°. Instead, the holding element comprises individual, inwardly projecting partial segments, which on their inwardly directed inner side are formed with a threaded structure.

When the nozzle body is rotated, the coupling member of the valve body is taken along with the valve body and thereby is rotated. Thus, the valve body is rotated when axially displaced within the nozzle body upon rotation of the latter. For this purpose, the nozzle body is formed with receiving slots extending radially through the nozzle body wall and being open towards the air intake end of the nozzle body. In such an arrangement, the coupling member of the valve body is provided with spoke-like webs immersed into the receiving slots of the nozzle body. When the nozzle body is rotated and the valve body is thus displaced, these webs will be axially displaced within the slots.

Preferably, the valve body and the coupling member are formed as one part, particularly as an injection-molded (plastic) member.

By way of alternative to the above described threaded engagement between the coupling member and the holding element, the coupling member of the valve body can be guided in axial guide grooves of the holding element, and the axial displacement of the valve body can be performed through slots in the nozzle body wall which are formed in ascending orientation in the manner of a thread. Also in this case, it is of course possible to form the valve body and the coupling member as one part, e.g. as an injection-molded member of plastic or the like.

The forming of the valve body as an injection-molded (plastic) member results in the formation of an undesired sprue cone on the valve body. This projection impairs the homogeneity of the surface of the valve body, which under the aspect of flow technology will cause a noise to be generated. Preferably, this sprue cone is accommodated completely within a trough-like spherical deepened portion on that end of the valve body which is facing toward the air intake opening of the nozzle body and is subjected to the onflow of air. Beyond this measure, it is preferred under the aspects of flow technology and particularly for the suppression of noise development that the end of the valve body subjected to the onflow of air has a rounded shape, i.e. is substantially hemispherical. In this case, the trough-like deepened portion is preferably arranged in the apex region of the rounded end of the valve body.

Each of the above described features of the valve body, i.e. the one-pieced configuration of the valve body and the coupling member, the rounded shape of the end of the valve body subjected to the onflow of air and the accommodation of the sprue cone in the trough-like deepened portion, is adapted for legal protection individually and in combination with any other of these features; particularly, these features need not be necessarily combined with the hollow shape of the valve body and the provision of the cover member.

Already above, in connection with the guiding engagement between the coupling member and the holding element, the advantage of the segmented inner thread of the holding element by the formation of circumferentially spaced partial segments has been pointed out. The segmented inner thread does not only save weight but also facilitates the production of the holding element as an injection-molded (plastic) member. Thus, the quality of the outer surface of the holding element is increased without the need for a mechanical finishing treatment such as e.g. polishing. By the segmented inner thread, excess accumulation of material on the inner side of the holding element are avoided, thus reducing the shrinkage of the injection-molded holding element. The improved surface quality of the holding element is of advantage with regard to the air-tight insertion of the holding element in a corresponding holding recess in the ceiling paneling. In this context, it is to be noted that the holding elements of known air outlet devices are spherical so that the placement of such a spherical holding element in the holding recess will result in a ball-bearing arrangement which allows for an individual adjustment of the nozzle body with a spatial angular range. For the air-tight accommodation of the spherical holding element in the holding recess, a uniformly round surface of the holding element is required, which—as explained above—is enhanced by the segmented configuration of the inner thread. According to another aspect of the inventive air outlet device, the nozzle body comprises an operating member to be manually turned for adjustment and extending to a position external of the holding element, and a sleeve member arranged within the holding element and connected to the operating member for common rotation therewith. The operating member and the sleeve member are arranged to grip around the edge of the accommodating opening of the holding element having the nozzle body arranged for rotation thereon. Since the nozzle body is formed in two parts (operating member and sleeve member), these two parts can be inserted into the holding element from opposite sides. Thus, particularly, the operating member can have an outer diameter larger than that of the accommodating opening because the operating member will not be inserted anymore into the accommodating opening via the central passage opening as provided in the air outlet device known from U.S. Pat. No. 5,399,119 but will be moved from outside against the holding element. In doing so, the operating member will remain external of the holding element so that its outer diameter can be selected to be larger than the diameter of the accommodating opening of the holding element.

Preferably, the operating member is provided with a collar portion joining the operating portion and having an outer diameter equal to or slightly smaller than the diameter of the accommodating opening. With the collar portion inserted into the holding element, the sleeve member will then be mounted onto the collar portion. Thereafter, the collar portion forms a part of the inner side of the nozzle body and thus a part of the inner side of the air channel extending through the holding element. The second part of this air channel is formed by the sleeve member if the latter is advantageously arranged to project beyond the collar portion in the direction towards the air intake opening of the nozzle body. The sleeve member is e.g. provided with the above-described receiving slots for the coupling member of the valve body.

In any case, the above described two-part configuration of the nozzle body will lend the nozzle body a cylindrical inner side which is substantially free of sudden transitions, i.e. is substantially without non-uniform regions. Thus, there is obtained a smooth inner side which, under the flow-technology aspect, is in turn of advantage with regard to the resistance and the noise reduction.

The above-described two-part configuration of the nozzle body provides for a clear functional separation between the manipulation of the nozzle body and the guidance of the air stream through the nozzle body. The operating portion whereon the nozzle body is manually turned for setting the axial position of the valve body, is arranged to radially project beyond the accommodating opening of the holding element, thus covering the accommodating edge and consequently a possible annular gap generated between the nozzle body and the holding element. Due to its enlarged radial dimensions, the operating portion is manually gripped and operated (turned) in an easier manner.

As a result of its two-part configuration, the nozzle body—as already described above in connection with the closing end of the valve body—can be adapted to the design of the surface regions of the interior of the vehicle surrounding the air outlet device without the requirement that the whole valve body consist of a material of the same design that would thus possibly cause higher expenses.

A preferred embodiment of the instant invention will be explained in greater detail hereunder with reference to the accompanying drawings.

DETAILED DESCRIPTION OF A PREFERRED EMBODIMENT

Figure 1:
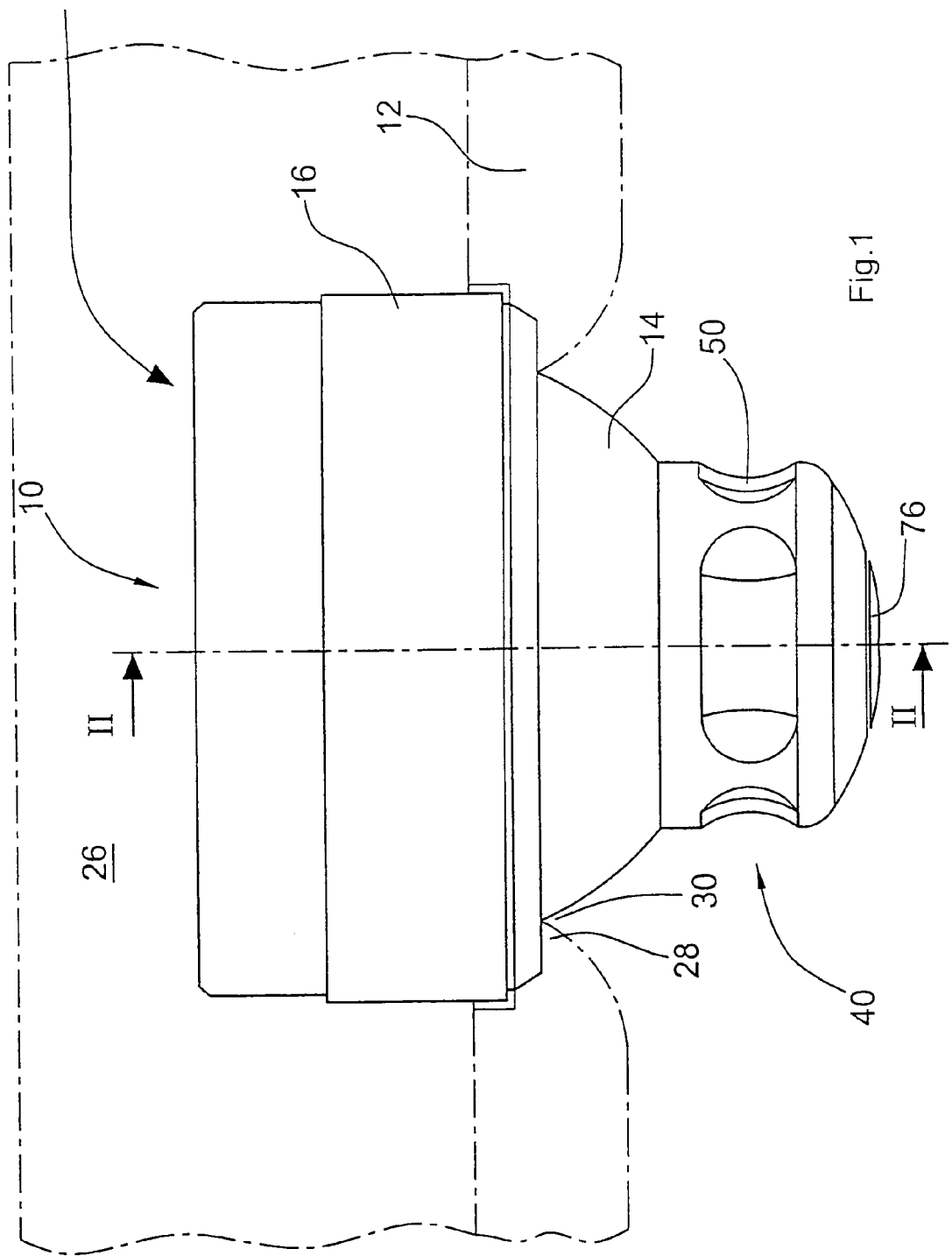
FIG. 1 is a lateral view of the air outlet device for air supply towards a seat in a vehicle, such as e.g. an aircraft or bus, with the paneling on the ceiling schematically outlined.

FIGS. 1 to 4 illustrate the configuration of an air outlet device 10 and the cooperation of the various components of the device 10. According to FIG. 1, the air outlet device 10 is arranged in the ceiling paneling 12 above a passenger seat e.g. of an airplane or bus. By manual operation of the air outlet device 10, the intensity and the direction of a discharged air flow can be changed.

The air outlet device 10 comprises a spherical holding element 14 arranged in a cylindrical accommodating element 16 to be pivoted in element 16 within a spatial angle dictated by the constructional design. This accommodating element 16 is shaped after the manner of a shell and on its end adjacent the ceiling paneling 12 is provided with an inner flange 18 (cf. FIG. 2) abutting the spherical outer side of spherical holding element 14. The spherical holding element 14 is inserted, from the end of accommodating element 16 opposite the inner flange 18, into a support element 20. The outer side of support element 20, abutting the accommodating element 16, is cylindrical, and the side of support element 20 abutting the holding element 14 is spherically concave. Support element 20 does not only serve for support of spherical holding element 14 but also for effecting an air-tight closure of the space between accommodating element 16 and holding element 14. In its mounting position shown in FIG. 2, support element 20 is biased by a corrugated spring ring 22 supported on support element 20 and on a retaining ring 24 secured on the accommodating element 16.

As shown in FIG. 1, the accommodating element 16 is arranged in a chamber or shaft 26 supplied with pressurized air and, by its end provided with the inner flange 18, is arranged in sealing abutment on the edge 28 of an opening 30 of the ceiling paneling 12. Thus, a part of the spherical holding element 14 and an operating member for setting the intensity and the direction of the air flow will project from opening 30.

Figure 2:
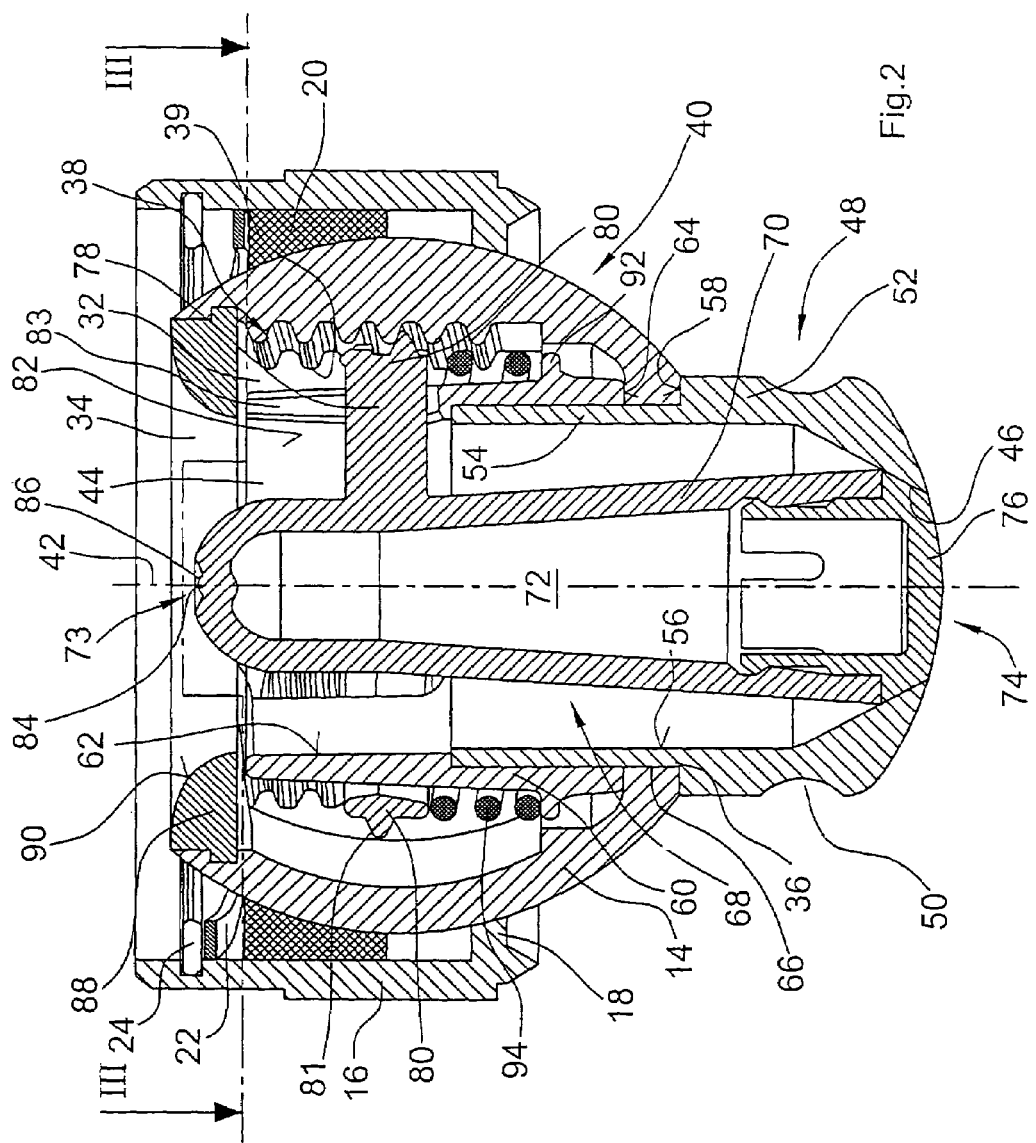
FIG. 2 is a sectional view taken along the line II—II in FIG. 1.
Figure 3:
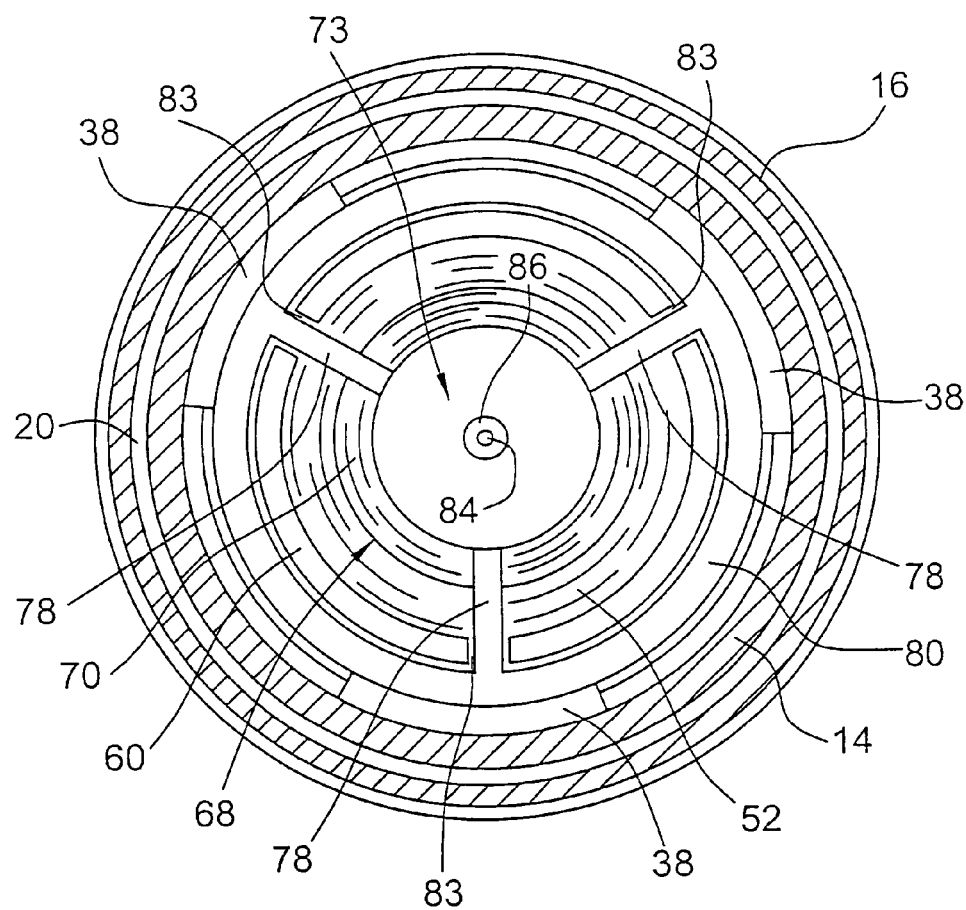
FIG. 3 is a sectional view taken along the line III—III in FIG. 2.
Figure 4:
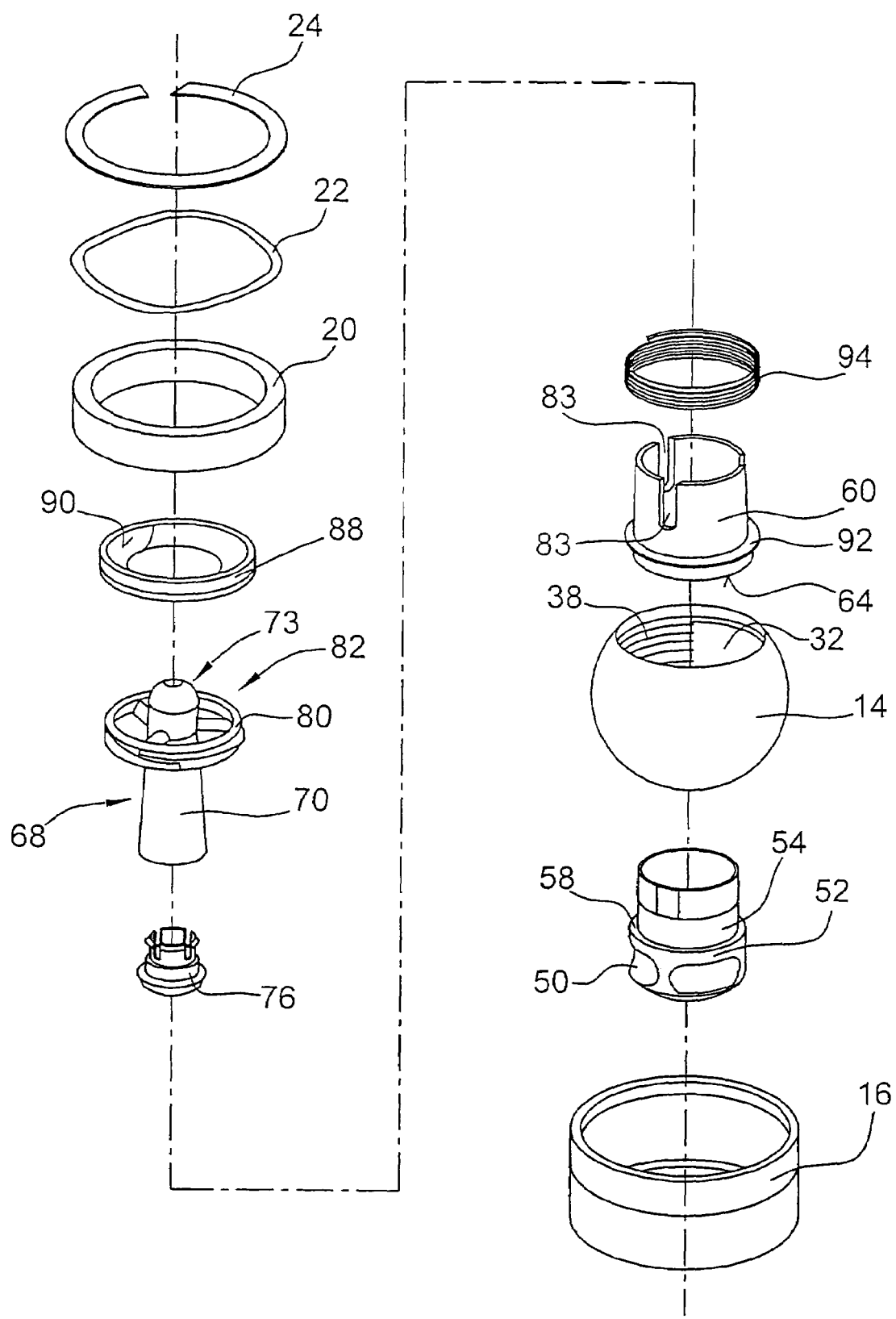
FIG. 4 is an exploded view of the individual components of the air outlet device of FIGS. 1 to 3.

As evident from FIGS. 2 and 4, the spherical holding element 14 is formed with a spherical wall and a central through passage 32 which extends from a first opening 34 to a (second) accommodating opening 36. Arranged on the inner side of through passage 32 are three thread part-segments 38 displaced by 60° relatively to each other in the circumferential direction (see particularly FIG. 3) and together forming an inner thread 39. In the accommodating opening 36 of the holding element 14, a nozzle body 40 is arranged for rotation about a central axis 42 of the through passage 32 of holding element 14. This nozzle body 40 comprises an air intake opening 44 and an air outlet opening 46. The nozzle body 40 is formed in two parts and comprises an operating member 48 projecting from out of the accommodating opening 36 of holding element 14. On its cylindrical outer side, the nozzle body 40 is provided with trough-like gripping recesses 50 to facilitate the manual gripping of the nozzle body 40 for rotating the same. Provided in the operating member 48 is the air outlet opening 46 of the nozzle body 40 which is arranged concentrically to the central axis 42 of the through passage 32 of holding element 14.

The operating member 48 is provided with an operating portion 52 comprising the operating recesses 50, and with a collar portion 54 which projects from the operating portion 52 into the holding element 14. While the inner side 56 of the operating member 48 within the collar portion 54 and the joining part of the operating portion 52 is of a cylindrical shape, the outer side between the operating portion 52 and the collar portion 54 has a shoulder surface or radial surface 58 formed thereon. Mounted to the collar portion 54 is a sleeve member 60 of nozzle body 40, of which the cylindrical inner side 62 merges into the cylindrical inner side 56 of operating member 48. The sleeve member 60 and the operating member 48 are bonded to each other. In combination, these two members form the air guiding channel within nozzle body 40.

The sleeve member 60 is spaced from the shoulder surface 58 of operating member 48. Thus, between the shoulder surface 58 and the opposite end face 64 of sleeve member 60, the outer side of the nozzle body 40 is provided with a receiving groove 66 into which the edge of the accommodating opening 36 of holding element 14 is immersed. In this manner, nozzle body 40 is supported for rotation on holding element 14.

Within the nozzle body 40, a valve body 68 is arranged which comprises a frustoconical or domed wall 70 and a hollow space 72 delimited by wall 70. The valve body 68 has a closed end 73 facing toward the air intake opening 44 of nozzle body 40 and an open end 74 facing toward the air outlet opening 46 of nozzle body 40. A cover portion 76 is inserted into the open end 74 by a snap-on connection or by retention of self substance. The edge of cover member 76 and the end 74 of valve body 68 form the closing end of valve body 68 by which the valve body 68 can close the air outlet opening 46 to a larger or lesser extent.

The valve body 68 is formed as an injection-molded (plastic) member, which is the case also for most of the other components of the air outlet device 10. Valve body 68 is arranged for rotation and axial displacement in holding element 14 and nozzle body 40, respectively. For this purpose, nozzle body 40 is provided with three radially projecting webs 78, which on their ends facing away from valve body 68 are connected to each other by means of a ring 80. This ring 80 has its outer side provided with an outer thread 81 engaging the segmented inner thread 38 of the spherical holding element 14. The webs 78 and the ring 80 in combination form a coupling member 82 by which the valve body 68 is mechanically coupled both to the holding element 14 and with the nozzle body 40. This coupling is performed by means of axial receiving slots 83 formed in the sleeve member 60 and having the webs 78 immersed therein. The number of the webs 78 and of the axial receiving slots 83 each time amounts to three, while also other numbers are possible. Due to the axial receiving slots 83, the valve body 68 is taken along via the coupling member 82 when the sleeve member 60 is rotated. Thus, because of the threaded engagement between the coupling member 82 and the holding element 14, the valve body 68 will be axially moved within the nozzle body 40.

As already mentioned, the valve body 68 and the coupling member 82 are formed as one injection-molded plastic member. The sprue cone 84 of this molded member is arranged within a spherical deepened portion 86 at the closed end 73 of valve body 68. Besides, this end 73 is of a semispherical, i.e. rounded shape, which under the aspect of flow technology is advantageous with respect to the possible noises and the flow resistance. Again for reasons of flow technology, a flow guiding element in the form of a guiding ring 88 is inserted into the end of the spherical holding element 14 facing away from the accommodating opening 36. The inner side of guiding ring 88 is substantially flush with the inner side 62 of sleeve member 60, and the guiding ring side 90 facing toward the air flow is rounded in a convex shape. This guiding ring covers the space between the spherical holding element 14 and the nozzle body 40.

Finally, it should be mentioned that a biased helical spring 94 is arranged between the webs 78 and an outer abutment ring 92 of the sleeve member 60, serving for the reliable maintenance of the present position of the valve body 68 within the nozzle body 40.

What is claimed is:

1. An air outlet device for a vehicle, comprising:
   a nozzle body with an air intake opening and an air outlet opening,
   a holding element formed with an accommodating opening having the nozzle body supported therein for rotation about a longitudinal axis extending through the air intake opening and the air outlet opening, and
   a valve body, arranged coaxially within the nozzle body and guided by the holding element, which valve body upon rotation of the nozzle body can be displaced in the nozzle body between a closing position for blocking the air outlet opening and a maximum opening position for clearing the air outlet opening to the maximum extent,
   wherein the valve body comprises a coupling member being in guiding engagement with the holding element and arranged to be taken along by the nozzle body upon rotation of the same,
   wherein the coupling member is provided with webs projecting from the valve body and with ring connecting the webs to each other, and wherein the webs of the coupling member extend through receiving slots of the nozzle body which are open toward the air intake opening of the nozzle body, the ring of the coupling member being arranged externally of the nozzle body, and
   wherein the coupling member is formed in one piece with the valve body.

2. The air outlet device according to claim 1, wherein the valve body and the coupling member are formed as an integral injection-molded member.

3. The air outlet device according to claim 1, wherein the coupling member comprises an outer thread and the holding element comprises an inner thread, the inner thread of the holding element comprising partial segments spaced from each other in the circumferential direction.

4. The air outlet device according to claim 1, wherein the valve body has a closing end facing towards the air outlet opening of the nozzle body, with a cover member.

5. The air outlet device according to claim 1, wherein the valve body has an end facing towards the air intake opening of the nozzle body that is of a rounded shape.

6. The air outlet device according to claim 1, wherein the valve body has a rounded end with an apex and a substantially spherical deepened portion in the region of the apex of its rounded end.

7. The air outlet device according to claim 6, wherein the valve body has a sprue cone arranged within the spherical deepened portion of its rounded end.

8. The air outlet device according to claim 1, wherein the holding element is of a spherical shape and comprises a central through passage provided with the accommodating opening for the nozzle body.

9. The air outlet device according to claim 1, wherein the nozzle body comprises an operating member to be manually turned for adjustment and extending to a position external of the holding element, and a sleeve member arranged within the holding element and connected to the operating member for common rotation therewith.

10. The air outlet device according to claim 9, wherein the operating member in the region of an operation portion arranged externally of the holding element, and the sleeve member each have a larger radial dimension than the accommodating opening of the holding element.

11. The air outlet device according to claim 9, wherein the operating member comprises a collar portion joining the operation portion while extending through the accommodating opening of the holding element into the holding element and forming at least a part of the inner side of the nozzle body, and wherein the sleeve member is configured to be mounted on the collar portion.

12. The air outlet device according to claim 11, wherein the sleeve member extends beyond the collar portion of the operating member into the holding element and in this region forms the inner side of the nozzle body.

13. The air outlet device according to claim 9, wherein the inner side of the nozzle body is substantially cylindrical.

14. The air outlet device according to claim 1, wherein the nozzle body comprises a receiving groove with the holding element immersed therein by its edge delimiting the accommodating opening for the nozzle body.

15. The air outlet device according to claim 14, wherein the receiving groove is delimited by confronting surfaces of the operating member and the sleeve member.

* * * * *